United States Patent
Kuwahara (10) Patent No.: US 9,019,648 B1
(45) Date of Patent: Apr. 28, 2015

(54) MAGNETIC DISC DEVICE AND SELF SERVO WRITING METHOD

(71) Applicant: Kabushiki Kaisha Toshiba, Tokyo (JP)

(72) Inventor: Satoshi Kuwahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/254,626

(22) Filed: Apr. 16, 2014

Related U.S. Application Data (60) Provisional application No. 61/935,181, filed on Feb. 3, 2014.

(51) Int. Cl.
  G11B 21/02  (2006.01)
  G11B 5/596  (2006.01)

(52) U.S. Cl.
  CPC .................................. G11B 5/59633 (2013.01)

(58) Field of Classification Search
  None
  See application file for complete search history.

(56) References Cited

U.S. PATENT DOCUMENTS

| 6,437,935 | B1* | 8/2002 | Johnson et al. .................. 360/75 |
| 7,085,084 | B2 | 8/2006 | Yasuna et al. |
| 7,177,111 | B2* | 2/2007 | Gururangan et al. ........... 360/75 |
| 7,639,446 | B2 | 12/2009 | Mizukoshi et al. |
| 8,482,877 | B2 | 7/2013 | Akagi et al. |
| 8,687,312 | B1* | 4/2014 | Liang ............................... 360/75 |
| 2002/0105751 | A1* | 8/2002 | Yasuna et al. ............... 360/78.04 |
| 2005/0152060 | A1* | 7/2005 | Gururangan et al. ........... 360/75 |
| 2007/0076317 | A1* | 4/2007 | Keast .............................. 360/75 |
| 2007/0253095 | A1* | 11/2007 | Washizu et al. ............ 360/77.08 |
| 2011/0181977 | A1* | 7/2011 | Kim et al. ........................ 360/48 |
| 2011/0279924 | A1* | 11/2011 | Albrecht et al. ................. 360/75 |

FOREIGN PATENT DOCUMENTS

JP   2008-243266   10/2008

* cited by examiner

*Primary Examiner* — Paul Huber
(74) *Attorney, Agent, or Firm* — Knobbe Martens Olson & Bear LLP (57) ABSTRACT

According to one embodiment, a magnetic disc device includes a magnetic disc in which servo data is recorded in a servo area; a magnetic head provided for the magnetic disc; a determination unit that determines an SSW range in the servo area; and a servo control unit that performs servo control of the magnetic head based on the servo data recorded in the SSW range.

19 Claims, 7 Drawing Sheets

| M0 | AI0 : AO0 |
|----|-----------|
| M1 | AI1 : AO1 |
| M2 | AI2 : AO2 |
| M3 | AI3 : AO3 |

10A

MAGNETIC DISC DEVICE AND SELF SERVO WRITING METHOD

CROSS-REFERENCE TO RELATED APPLICATIONS

This application is based upon and claims the benefit of priority from Provisional Patent Application No. 61/935,181, filed on Feb. 3, 2014; the entire contents of which are incorporated herein by reference.

FIELD

Embodiments described herein relate generally to magnetic disc devices and self servo writing methods.

BACKGROUND

In a magnetic disc device, a method for writing servo data into a disc surface via a magnetic head of the magnetic disc device has been employed (self servo writing method (hereinafter, referred to as SSW)).

DETAILED DESCRIPTION

In general, according to one embodiment, a magnetic disc device includes a magnetic disc in which servo data is recorded in a servo area, a magnetic head provided for the magnetic disc, a determination unit that determines an SSW range in the servo area, and a servo control unit that performs servo control of the magnetic head based on the servo data recorded in the SSW range.

Exemplary embodiments of a magnetic disc device and a self servo write method will be explained below in detail with reference to the accompanying drawings. The present invention is not limited to the following embodiments.

First Embodiment

Figure 1:
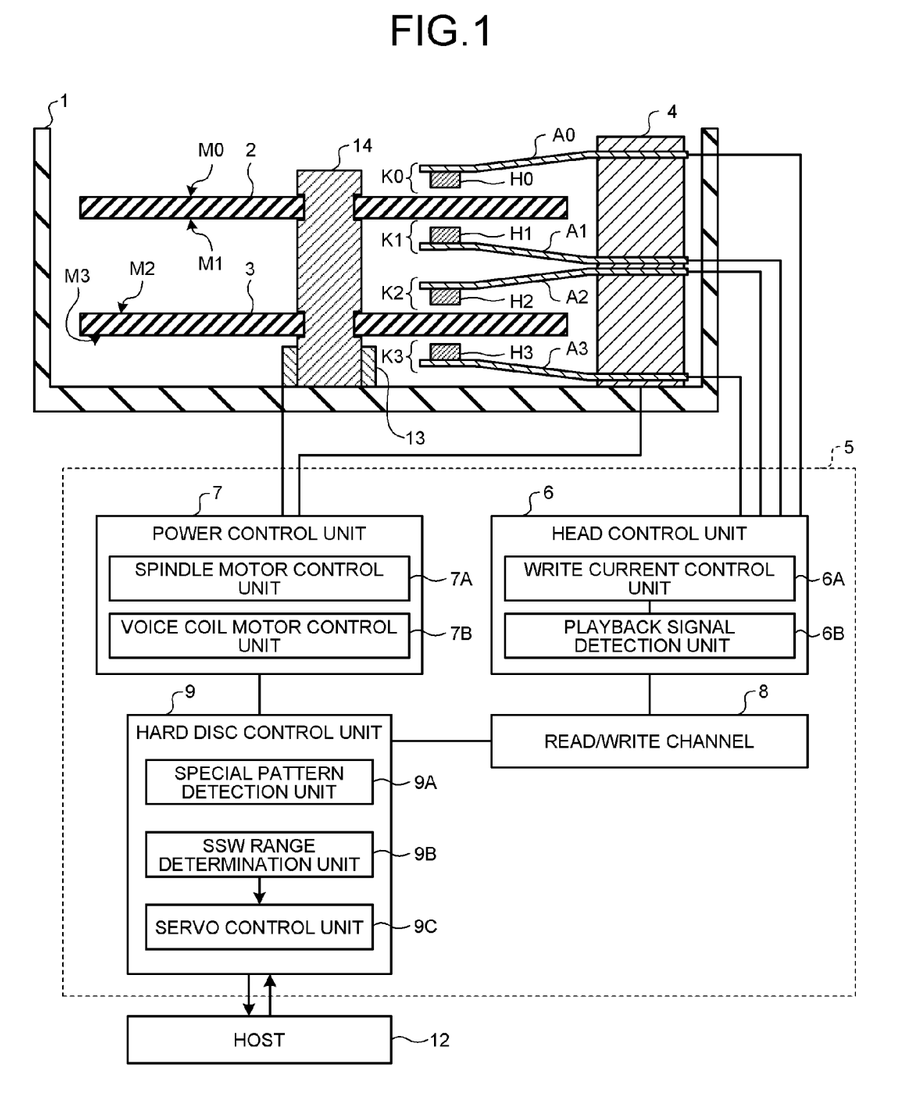
FIG. 1 is a schematic block diagram of a configuration of a magnetic disc device according to a first embodiment.

FIG. 1 is a schematic block diagram of a configuration of a magnetic disc device according to a first embodiment.

Referring to FIG. 1, the magnetic disc device includes a plurality of magnetic discs 2 and 3, the magnetic disc 2 has disc surfaces M0 and M1 on both sides thereof, and the magnetic disc 3 has disc surfaces M2 and M3 on both sides thereof. The magnetic discs 2 and 3 are integrally supported via a spindle 14. Each of the disc surfaces M0 to M3 is provided with a plurality of tracks. Each of the tracks is provided with a data area in which user data is to be recorded and a servo area in which servo data is recorded. The servo data can be recorded in the servo area by SSW. SSW ranges are individually set on the disc surfaces M0 to M3. At that time, special patterns are recorded on the disc surfaces M0 to M3 to indicate the ends of the SSW ranges on the disc surfaces M0 to M3. In addition, the magnetic disc device includes carriages K0 to K3 on the disc surfaces M0 to M3, respectively. The carriages K0 to K3 include magnetic heads H0 to H3 and arms A0 to A3, respectively. The magnetic heads H0 to H3 are held above the disc surfaces M0 to M3 via the arms A0 to A3 so as to be opposed to the disc surfaces M0 to M3, respectively. The arms A0 to A3 are capable of sliding the magnetic heads H0 to H3 in horizontal planes, respectively.

The magnetic disc device also includes a voice coil motor 4 driving the carriages K0 to K3 and a spindle motor 13 rotating the magnetic discs 2 and 3 via the spindle 14. The magnetic discs 2 and 3, the carriages k0 to K3, the voice coil motor (VCM) 4, the spindle motor 13, and the spindle 14 are stored in a case 1.

The magnetic disc device also includes a magnetic recording control unit 5. The magnetic recording control unit 5 includes a head control unit 6, a power control unit 7, a read/write channel 8, and a hard disc control unit 9. The head control unit 6 includes a write current control unit 6A and a playback signal detection unit 6B. The power control unit 7 includes a spindle motor control unit 7A and a voice coil motor control unit 7B. The hard disc control unit 9 includes a special pattern detection unit 9A, an SSW range determination unit 9B, and a servo control unit 9C. The processes of the special pattern detection unit 9A, the SSW range determination unit 9B, and the servo control unit 9C are realized by firmware executed at a general-purpose processor such as a CPU.

The head control unit 6 processes signals at recording and playback. The write current control unit 6A controls write currents flowing in the magnetic heads H0 to H3. The playback signal detection unit 6B detects signals read by the magnetic heads H0 to H3. The power control unit 7 drives the voice coil motor 4 and the spindle motor 13. The spindle motor control unit 7A controls rotation of the spindle motor 13. The voice coil motor control unit 7B controls driving of the voice coil motor 4. The read/write channel 8 converts signals played back by the magnetic heads H0 to H3 to a data format capable of being handled at a host 12, or converts data output from the host 12 to a signal format capable of being recorded by the magnetic heads H0 to H3. The foregoing format conversions include DA conversion and encoding. The read/write channel 8 also decodes signals played back by the magnetic heads H0 to H3 or subjects data output from the host 12 to code modulation. The hard disc control unit 9 performs recording/playback control under instructions from the host 12 or exchanges data between the host 12 and the read/write channel 8. The hard disc control unit 9 may be provided with a general-purpose processor for recording/playback control and a dedicated processor for exchanging data between the host 12 and the read/write channel 8. The special pattern detection unit 9A detects special patterns indicative of the ends of the SSW ranges on the disc surfaces M0 to M3. The SSW range determination unit 9B determines the SSW ranges in the servo areas of the disc surfaces M0 to M3. The servo control unit 9C performs servo control of the magnetic heads H0 to H3 based on the servo data recorded in the SSW ranges. The servo control includes seek control and tracking control of the magnetic heads H0 to H3.

The magnetic recording control unit 5 is connected to the host 12. The host 12 may be a personal computer issuing a write instruction or a read instruction to the magnetic disc device or may be an external interface.

Signals are read from the disc surfaces M0 to M3 via the magnetic heads H0 to H3 while the magnetic discs 2 and 3 are rotated by the spindle motor 13, and are detected by the playback signal detection unit 6B. The signals detected by the playback signal detection unit 6B are data-converted at the read/write channel 8, and then sent to the hard disc control unit 9. Then, at the hard disc control unit 9, tracking control is performed on the magnetic heads H0 to H3 based on burst data contained in the servo data detected at the playback signal detection unit 6B.

In addition, the current positions of the magnetic heads H0 to H3 are calculated based on a gray code contained in the servo data detected at the playback signal detection unit 6B, and seek control is performed on the magnetic heads H0 to H3 so as to be closer to the target positions.

In this example, when the signals read from the disc surfaces M0 to M3 are sent to the hard disc control unit 9, special patterns on the disc surfaces M0 to M3 are detected at the special pattern detection unit 9A. Then, at the SSW range determination unit 9B, the SSW ranges are determined for the disc surfaces M0 to M3 based on the special patterns on the disc surfaces M0 to M3. Then, at the servo control unit 9C, servo control is performed on the magnetic heads H0 to H3 based on the servo data recorded in the SSW ranges of the disc surfaces M0 to M3.

In this example, the magnetic discs 2 and 3 have eccentricity in spiral patterns for use in SSW, eccentricity generated at assembly of the magnetic discs 2 and 3, and the like. Accordingly, by setting the individual SSW range for the disc surfaces M0 to M3, it is possible to further extend the SSW ranges as compared to the case where all the SSW ranges of the disc surfaces M0 to M3 are made uniform. In addition, by determining the SSW ranges of the disc surfaces M0 to M3 based on the results of detection of the special patterns, it is possible to determine correctly the SSW ranges even when the SSW ranges of the disc surfaces M0 to M3 are different. This makes it possible to prevent redundancy or missing of cylinder addresses at the ends of the SSW ranges on reading of the servo data, thereby improving the accuracy of the servo control.

Figure 2:
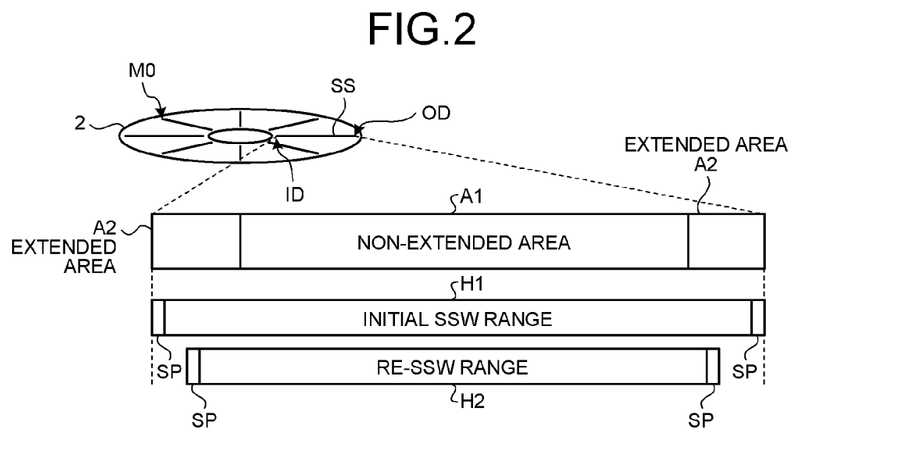
FIG. 2 is a diagram illustrating a method for setting SSW ranges on a disc surface of FIG. 1.

FIG. 2 is a diagram illustrating a method for setting SSW ranges on the disc surface of FIG. 1.

Referring to FIG. 2, for example, the disc surface M0 has a servo area SS arranged radially. The servo area SS includes a non-extended area A1 set uniformly to all of the disc surfaces M0 to M3 and an extended area A2 set individually to the disc surfaces M0 to M3. An initial SSW range H1 can be set as a range from an end ID of inside of the servo area SS to an end OD of outside of the same. At that time, to identify the initial SSW range H1 on the disc surface M0, special patterns SP can be inserted into ends of the initial SSW range H1.

When re-SSW is performed on the disc surface M0, a re-SSW range H2 may be set inside of the initial SSW range H1. Otherwise, the re-SSW range H2 may be set outside of the initial SSW range H1. At that time, to identify the re-SSW range H2 on the disc surface M0, the special patterns SP may be inserted into ends of the re-SSW range H2.

The foregoing matter also applies to the disc surfaces M1 to M3. However, the range of the extended area A2 can be varied according to eccentricities of the disc surfaces M0 to M3 or the like.

Figure 3A:
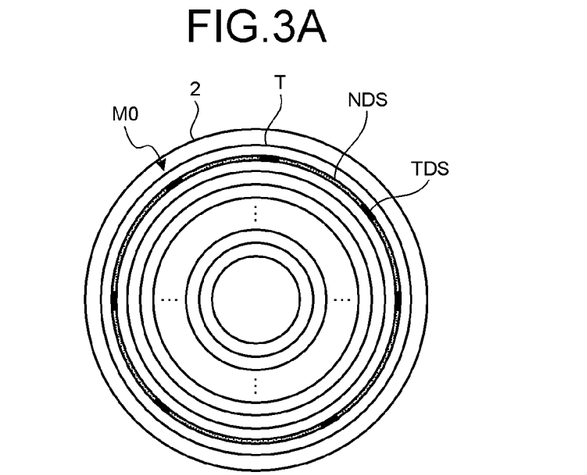
FIG. 3A is a plane view illustrating an insertion position of a special pattern on the disc surface of FIG. 1.
Figure 3B:
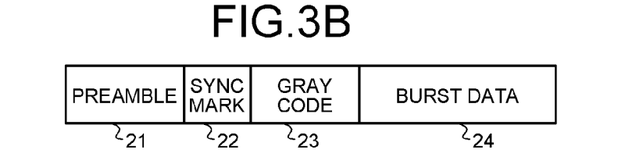
FIG. 3B is a diagram of a configuration of servo data written into an SSW area of FIG. 2.
Figure 3C:
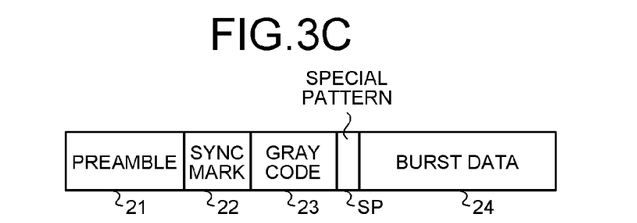
FIG. 3C is a configuration of servo data into which the special pattern is inserted.

FIG. 3A is a plane view illustrating an insertion position of a special pattern on the disc surface of FIG. 1, FIG. 3B is a diagram of a configuration of servo data written into the SSW area of FIG. 2, and FIG. 3C is a configuration of servo data into which the special pattern is inserted.

Referring to FIG. 3A, for example, a track T is provided on the disc surface M0. Recorded in the servo area SS of the disc surface M0 are servo data NDS into which the special pattern SP is not inserted and servo data TDS into which the special pattern SP is inserted. At that time, a plurality of tracks in which the servo data TDS is recorded may be arranged at ends of the initial SSW range H1 or the re-SSW range H2. The servo data TDS may not reside in all of the sectors of the tracks in which the servo data TDS is recorded, but the servo data TDS may reside in at least one sector of one track.

The servo data NDS is provided with a preamble 21, a synchronization mark 22, a gray code 23, and burst data 24, as illustrated in FIG. 3B. The gray code 23 can give servo addresses (sector address and cylinder address) in the down-track direction and the cross-track direction of the disc surface M0, and use the servo addresses for seek control to move the magnetic head H0 to a target track. The burst data 24 can be used for tracking control to position the magnetic head H0 within the range of the target track. The burst data 24 may be a null-type pattern, an area-type pattern, or a phase difference-type pattern.

The servo data TDS has the special pattern SP inserted into the servo data NDS, as illustrated in FIG. 3C. The special pattern SP may be obtained by replacing a portion of the gray code 23 in the servo data NDS by a cylinder address not existing in the gray code. This matter also applies to the disc surfaces M1 to M3. In addition, the servo data TDS includes the burst data 24 for use in tracking control so as to allow on-tracking on the track in which the servo data TDS is recorded.

The special pattern SP may not necessarily be inserted into the gray code 23 but may be provided in any mode as far as the special pattern SP can be detected after SSW. In addition, the special pattern SP may reside in anywhere of the disc surface M0 as far as the special pattern SP can be detected after SSW.

Figure 4:
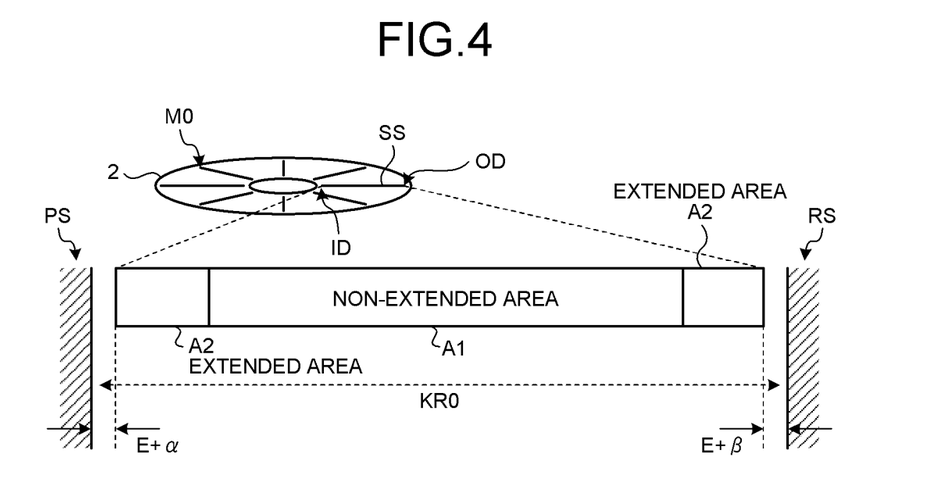
FIG. 4 is a diagram of range of an extended servo area on the disc surface of FIG. 1.

FIG. 4 is a diagram of the range of the extended servo area on the disc surface of FIG. 1.

Referring to FIG. 4, for example, it is possible to set the range of the servo area SS on the disc surface M0 within a movable range KR0 of the carriage K0 as an upper limit. For example, the range of the servo area SS can be set based on a range in which the amount of eccentricity E of the disc surface M0 is subtracted from the movable range KR0 of the carriage K0. At that time, the amount of eccentricity E may allow for margins α and β. The movable range KR0 of the carriage K0 may be set between an inner peripheral stopper position PS and a lamp position RS.

Figure 5:
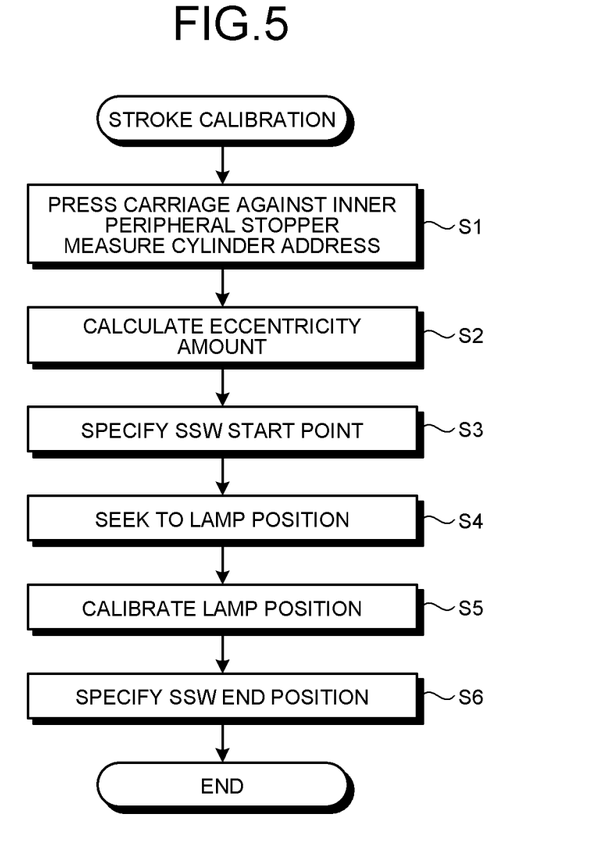
FIG. 5 is a flowchart of a method for extending the SSW range on the disc surface of FIG. 1.

FIG. 5 is a flowchart of a method for deciding the SSW range on the disc surface of FIG. 1. In the following description with reference to FIG. 5, the disc surface M0 is taken as an example, but the following description also applies to the disc surfaces M1 to M3.

Referring to FIG. 5, while the carriage K0 is pressed against the inner peripheral stopper position PS, the servo data on the disc surface M0 is read via the magnetic head H0, and the cylinder address of inner end ID of the servo area SS is detected (S1). Next, the amount of eccentricity E of the disc surface M0 is calculated based on the detected cylinder address (S2). At that time, when the disc surface M0 has eccentricity, the detected value of the cylinder address produces a sine-wave pattern in the down-track direction. It is thus possible to determine the amount of eccentricity E from the amplitude of the sine wave. Instead of the sine-wave pattern, a cosine-wave pattern may be used. When no servo data is found at the position of the magnetic head H0 while the carriage K0 is pressed against the inner peripheral stopper position PS, the magnetic head H0 is placed on a track at a specific cylinder in an area with servo data to estimate the amount of eccentricity E from the primary component of VCM power variation. Alternatively, VCM power may be controlled such that the servo data is read while the magnetic head H0 stays at a specific radial position to obtain the amount of eccentricity E.

Next, position information is acquired from the servo data immediately in front of the inner peripheral stopper position PS, and the position with necessary margin α according to the amount of eccentricity E with respect to the position information, is set as SSW start position (S3).

Next, the carriage K0 seeks to the lamp position RS (S4). Then, the position information is acquired from servo data immediately in front of the lamp position RS (S5), and the position with necessary margin β according to the amount of eccentricity E with respect to the position information, is set as SSW end position (S6).

By the foregoing process, it is possible to correctly adjust the range of the servo area SS on the disc surface M0 within the movable range KR0 of the carriage K0 as the upper limit.

Figure 6:
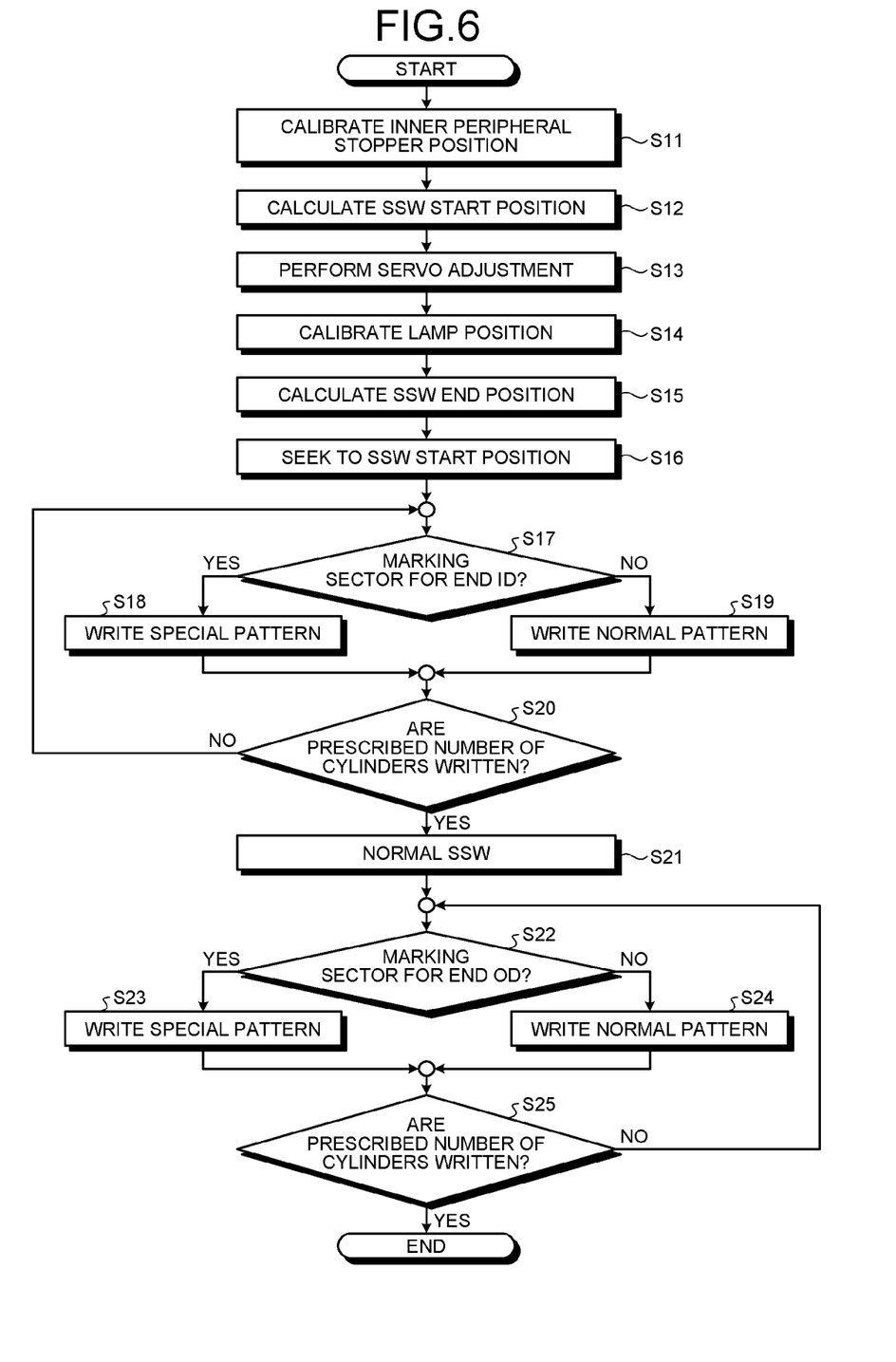
FIG. 6 is a flowchart of a method for inserting the special pattern in the magnetic disc device of FIG. 1.

FIG. 6 is a flowchart of a method for inserting the special pattern in the magnetic disc device of FIG. 1. In the following description with reference to FIG. 6, the disc surface M0 is taken as an example, but the following description also applies to the disc surfaces M1 to M3.

Referring to FIG. 6, position information is acquired when the carriage K0 is positioned immediately in front of the PS (S11), and the SSW start position is calculated from the position information (S12). Next, servo adjustment is performed (S13). As the servo adjustment, gain adjustment of the head amplifier, lift amount adjustment of the magnetic head H0, and servo gain adjustment may be performed, for example. Next, position information is acquired when the carriage K0 is positioned immediately in front of the lamp position RS (S14), and the SSW end position is calculated from the position information (S15). The steps S11 to S15 may be the same as the steps of FIG. 5.

Next, the magnetic head H0 seeks to the SSW start position (S16). Then, a seed pattern on the disc surface M0 is read via the magnetic head H0 to determine whether the seed pattern is a marking sector for the inner end ID of the servo area SS (S17). The seed pattern indicates position information on the magnetic head H0 when the servo data is recorded by SSW on the disc surface M0, and the seed pattern may be a spiral pattern. When the seed pattern is the marking sector for the inner end ID of the servo area SS (S17: Yes), the servo data TDS into which the special pattern SP is inserted illustrated in FIG. 3C is written on the disc surface M0 (S18). When the seed pattern is not the marking sector for the inner end ID of the servo area SS (S17: No), the servo data NDS into which the special pattern SP is not inserted illustrated in FIG. 3B is written on the disc surface M0 (S19). Then, it is determined whether data is written for a prescribed number of cylinders (S20). When no data is written for a prescribed number of cylinders (S20: No), the steps S17 to S20 are repeatedly performed.

When data is written for a prescribed number of cylinders (S20: Yes), normal SSW with no insertion of the special pattern SP is performed (S21), and then it is determined whether the data is the marking sector for an outer end OD of the servo area SS (S22). When the data is the marking sector for the outer end OD of the servo area SS (S22: Yes), the servo data TDS into which the special pattern SP is inserted illustrated in FIG. 3C is written on the disc surface M0 (S23). When the data is not the marking sector for the outer end OD of the servo area SS (S22: No), the servo data NDS into which the special pattern SP is not inserted illustrated in FIG. 3B is written on the disc surface M0 (S24). Next, it is determined whether data is written for a prescribed number of cylinders (S25). When no data is written for a prescribed number of cylinders (S25: No), the steps S22 to S25 are repeated until data is written for a prescribed number of cylinders (S25: Yes).

By the foregoing process, it is possible to insert the special pattern SP for a necessary number of cylinders into the ends ID and OD of the servo area SS.

Figure 7:
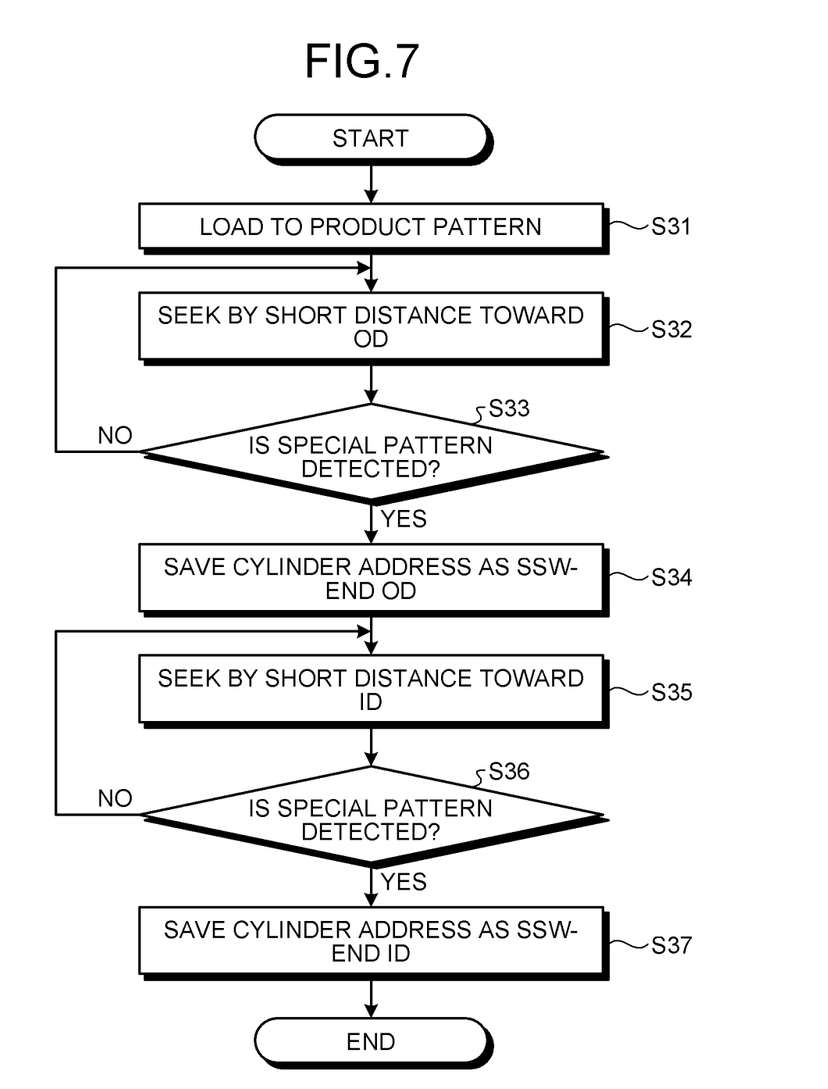
FIG. 7 is a flowchart of a method for determining the SSW range in the magnetic disc device of FIG. 1.

FIG. 7 is a flowchart of a method for determining the SSW range in the magnetic disc device of FIG. 1. In the following description with reference to FIG. 7, the disc surface M0 is taken as an example, but the following description also applies to the disc surfaces M1 to M3.

Referring to FIG. 7, after loading into a product servo pattern (servo pattern recorded by SSW) (S31), seek is conducted by a short distance (necessary to detection of the special pattern SP) toward the end OD of the servo area SS (S32). Then, it is determined whether the special pattern SP is detected (S33). When the special pattern SP is not detected (S33: No), the steps S32 and S33 are repeated until the special pattern SP is detected (S33: Yes). When the special pattern SP is detected (S33: Yes), the cylinder address at that time is saved as position information of the end OD of the servo area SS (S34).

Next, seek is conducted by a short distance toward the end ID of the servo area SS (S35). Then, it is determined whether the special pattern SP is detected (S36). When the special pattern SP is not detected (S36: No), the steps S35 and S36 are repeated until the special pattern SP is detected (S36: Yes). When the special pattern SP is detected, the cylinder address at that time is saved as position information of the end ID of the servo area SS (S37).

By the foregoing process, even when the SSW range is changed, it is possible to detect the ends ID and OD of the servo area SS and determine correctly the SSW range.

Second Embodiment

Figure 8:
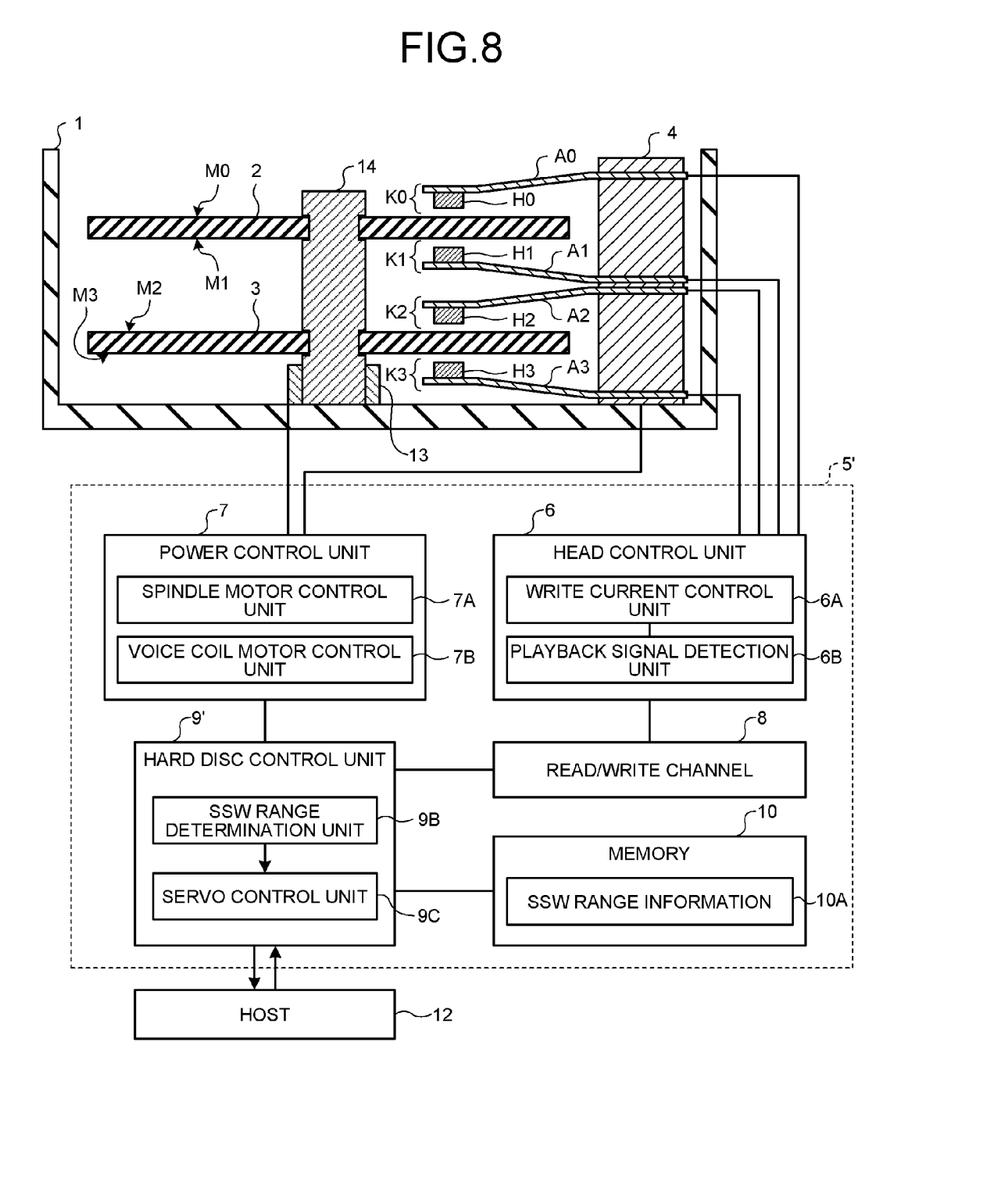
FIG. 8 is a schematic block diagram of a configuration of a magnetic disc device according to a second embodiment.

FIG. 8 is a schematic block diagram of a configuration of a magnetic disc device according to a second embodiment.

Referring to FIG. 8, the magnetic disc device has a magnetic recording control unit 5' instead of the magnetic recording control unit 5 illustrated in FIG. 1, and a hard disc control unit 9' instead of the hard disc control unit 9 illustrated in FIG. 1, and in addition, has a memory 10. The hard disc control unit 9' includes an SSW range determination unit 9B and a servo control unit 9C. The memory 10 stores SSW range information 10A indicative of an SSW range. The SSW range information 10A can be stored using an external device before product shipment.

Then, at the SSW range determination unit 9B, the SSW range is determined for each of the disc surfaces M0 to M3 based on the SSW range information 10A read from the memory 10 or stored in the memory 10. Then, at the servo control unit 9C, servo control is performed on each of the magnetic heads H0 to H3 based on the servo data recorded in the SSW ranges on the disc surfaces M0 to M3.

Figure 9:
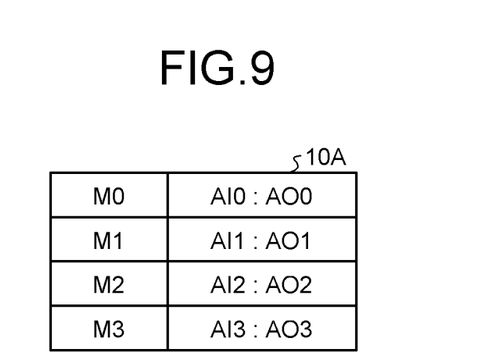
FIG. 9 is a diagram of a configuration example of SSW range information in the magnetic disc device according to the second embodiment.

FIG. 9 is a diagram of a configuration example of SSW range information in the magnetic disc device according to the second embodiment.

Referring to FIG. 9, stored on the disc surface M0 are addresses AI0 and AO0 corresponding to the ends ID and OD of the servo area SS, respectively. Stored on the disc surface M1 are addresses AI1 and AO1 corresponding to the ends ID and OD of the servo area SS, respectively. Stored on the disc surface M2 are addresses AI2 and AO2 corresponding to the ends ID and OD of the servo area SS, respectively. Stored on the disc surface M3 are addresses AI3 and AO3 corresponding to the ends ID and OD of the servo area SS, respectively.

In this case, by storing the SSW range information 10A in the memory 10, even when the disc surfaces M0 to M3 have different SSW ranges, it is possible to determine correctly the SSW ranges. Accordingly, it is possible to prevent redundancy and missing of cylinder addresses at the ends of the SSW ranges on reading of the servo data, thereby to improve the accuracy of servo control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disc device comprising:
   a magnetic disc in which servo data is recorded in a servo area;
   a magnetic head provided for the magnetic disc;
   a determination unit that determines an SSW range in the servo area; and
   a servo control unit that performs servo control of the magnetic head based on the servo data recorded in the SSW range,
   wherein the SSW range is individually set for each of disc surfaces of the magnetic disc.

2. The magnetic disc device according to claim 1, wherein
   a special pattern indicative of ends of the SSW range is recorded in the servo data, and
   the determination unit determines the SSW range based on results of the detection of the special pattern.

3. The magnetic disc device according to claim 1, further comprising a memory that stores SSW range information indicative of the SSW range, wherein
   the determination unit determines the SSW range based on the SSW range information.

4. The magnetic disc device according to claim 1, wherein the SSW range is set within a movable range of a carriage with the magnetic head as an upper limit.

5. The magnetic disc device according to claim 4, wherein the SSW range is set based on a range in which the amount of eccentricity of the magnetic disc is subtracted from the movable range of the carriage.

6. The magnetic disc device according to claim 1, wherein the SSW range is a re-SSW range different from an initial SSW range.

7. The magnetic disc device according to claim 6, wherein
   a special pattern indicative of ends of the re-SSW range is recorded at the ends of the re-SSW range, and
   the determination unit determines the re-SSW range based on results of the detection of the special pattern.

8. The magnetic disc device according to claim 2, wherein the special pattern is obtained by replacing a portion of a gray code of the servo data by a cylinder address not existing in the gray code.

9. The magnetic disc device according to claim 8, wherein a plurality of tracks recording the special pattern is arranged at the ends of the re-SSW range.

10. A self servo write method for a magnetic disc device with a plurality of magnetic discs, the method comprising setting an SSW range individually for each of disc surfaces of the magnetic discs.

11. The self servo write method according to claim 10, wherein the servo area includes:
    a non-extended area set uniformly to all of the disc surfaces; and
    an extended area set individually to each of the disc surfaces.

12. The self servo write method according to claim 11, further comprising recording a special pattern indicative of ends of the SSW range in the servo area.

13. The self servo write method according to claim 11, further comprising storing SSW range information indicative of the SSW range in a memory.

14. The self servo write method according to claim 11, further comprising setting the SSW range within a movable range of a carriage with the magnetic head as an upper limit.

15. The self servo write method according to claim 14, further comprising setting the SSW range based on a range in which the amount of eccentricity of the magnetic disc is subtracted from the movable range of the carriage.

16. The self servo write method according to claim 11, wherein the SSW range is a re-SSW range different from an initial SSW range.

17. The self servo write method according to claim 16, further comprising recording a special pattern indicative of ends of the re-SSW range at the ends of the re-SSW range.

18. The self servo write method according to claim 12, further comprising obtaining the special pattern by replacing a portion of a gray code of the servo data by a cylinder address not existing in the gray code.

19. The self servo write method according to claim 18, further comprising arranging a plurality of tracks recording the special pattern at the ends of the re-SSW range.

* * * * *